Patented Oct. 23, 1945

2,387,571

UNITED STATES PATENT OFFICE 2,387,571

HEAT-STABILIZED HIGH-POLYMER HALOGEN-CONTAINING PRODUCTS

Hans Fikentscher, Ludwigshafen-on-Rhine, and Richard Roehm, Troisdorf-Oberlar, Germany; vested in the Alien Property Custodian No Drawing. Application May 2, 1941, Serial No. 391,512. In Germany January 2, 1940

6 Claims. (Cl. 260—88)

The present invention relates to high-polymer halogen-containing substances of improved heat-stability.

High-polymer substances containing halogen have a marked tendency to split off hydrogen halide on heating. The hydrogen halide so liberated not only causes discoloration of the substances but also attacks the metallic parts of the equipments in which the substances are worked, for example rollers or molds, and also metallic parts embedded in the finished molded articles made from the high-polymer substances.

It has been proposed to employ lead compounds as heat stabilizing agents. The poisonous effect of the lead compounds and their tendency to undergo discoloration in the presence of even slight quantities of hydrogen sulphide, however, prejudices their use in practice.

It is also well known to add basic substances, as for example alkali metal salts of weak organic acids, carbonates or hydroxides of the alkali or alkaline earth metals or organic nitrogenous compounds having a weak basic action, as stabilizing agents. These substances, indeed, absorb and neutralize the hydrogen halide split off in the heat, but, on the other hand, on account of their alkaline reaction, accelerate the splitting off of hydrogen halide in the heat from many high-polymer substances containing halogen so that in these cases completely colorless molded articles cannot be obtained. Ureas and thioureas too, which have been proposed as stabilizing agents, when added alone, do not prevent the high-polymer halogen-containing substances from becoming brown in the heat.

We have now found that the heat-resistancy of high-polymer halogen-containing substances can be markedly improved by adding small amounts of alkaline substances and, in addition thereto, alcohols as stabilizing agents. As alkaline substances there may be mentioned the alkali metal and alkaline earth metal hydroxides and carbonates and salts of weak acids, especially of organic acids or of basic acid, furthermore basic phosphates.

Suitable alcohols are preferably the higher boiling alcohols, as for example dodecyl alcohol, octodecyl alcohol, phenylethyl alcohol, hydroxyethyl cresol and hydroxyethyl naphthol, dekahydronaphthol and hydroxydodekahydrodiphenyl, but low boiling alcohols may also be used.

Among high-polymer halogen-containing substances which can be stabilized according to our present invention may be mentioned, for example, chlororubber, polyvinyl chloride, chlorinated polyvinyl chloride, polymeric as-dichlorethylene, polymeric chloracrylic compounds and interpolymerization products of the monomeric compounds forming the basis of the above polymerization products, either among each other or with other polymerizable substances. The highly polymerized substances containing halogen may also contain softeners.

The stabilized high-polymer halogen-containing substances according to the present invention, are well resistant even when heated for a long time, having far less a tendency towards discoloration than when stabilized with the stabilizing agents hitherto proposed. While alkaline substances would also absorb and neutralize the hydrogen halide set free in the heat, their undesirable alkaline action is apparently lessened by the addition of an alcohol, so that they no longer tend to favor the splitting off of hydrogen halide.

The quantities of the alkaline substances and alcohols may vary within rather wide limits. Generally speaking, additions of from 0.1 to 1 per cent of the alkaline substance and of from 0.5 to 4 per cent of an alcohol are most suitable. There exists a definite rate of the stabilizing agents for each of the high-polymer halogen-containing substances exerting the best stabilizing effect, which rate may easily be ascertained by experiments.

The stabilizing agents may be added in a dissolved or suspended state or as a powder to the high-polymer halogen-containing substances, which may also be present in a dissolved, dispersed or solid state. In practice the stabilizing agents are most advantageously incorporated in the high-polymer halogen-containing substances as uniformly distributed as possible already before the substances are worked up in the heat, but the stabilizing agents may also be added while the substances are being worked in the heat, for example rolled or molded. In some cases the stabilizers may already be added to the high-polymer halogen-containing substances in the stage of their preparation, for example during their polymerization.

The present invention allows of heat molding high-polymer halogen-containing substances into completely colorless articles whereas the same articles hitherto obtained were more or less discolored.

The following example will further illustrate how the present invention may be carried out in practice, but the invention is not restricted to this example. The parts are by weight.

Example 100 parts of an interpolymerization product obtained by emulsion-polymerization of 95 parts of vinyl chloride and 5 parts of butyl acrylate which had been washed with sodium carbonate solution after precipitation and after drying still contained 0.3 per cent of sodium carbonate, are admixed with 3 parts of octodecyl alcohol in a ball mill. The polymerization product is then rolled on a hot roller at 165° C. for 15 minutes and drawn off as a sheet having 0.1 millimeter in thickness. The sheet is completely colorless and becomes slightly brown only after a two hours' storage at 155° C., whereas sheets made in the same manner but without the addition of octodecyl alcohol become brown already during the rolling.

The other alcohols enumerated above have the same effect.

What we claim is:

1. Heat stable compositions consisting of a solid high polymer halogen-containing substance selected from the class consisting of chloro rubber, polyvinyl chloride, chlorinated polyvinyl chloride and polymeric as-dichloroethylene, an alkaline substance selected from the group consisting of alkali carbonates and an alcohol selected from the class consisting of dodecyl alcohol, octadecyl alcohol, phenyl ethyl alcohol, hydroxy-ethyl cresol, hydroxy ethyl naphthol, dekahydronaphthol, and hydroxy-dodekahydrodiphenyl.

2. Compositions as defined in claim 1 wherein the alkaline substance is present in an amount of from 0.1 to 1 per cent and the alcohol is present in an amount of from .5 to 4 per cent by weight.

3. Compositions as defined in claim 1 wherein said solid high polymer halogen-containing substance is polyvinyl chloride.

4. Compositions as defined in claim 1 wherein said solid high polymer halogen-containing substance is polyvinyl chloride and said alcohol is octadecyl alcohol.

5. The process of heat stabilizing solid high polymer halogen containing substances selected from the class consisting of chloro rubber, polyvinyl chloride, chlorinated polyvinyl chloride, and polymeric as-dichloroethylene, which consists in admixing therewith an alkaline substance selected from the group consisting of alkali carbonates and an alcohol selected from the class consisting of dodecyl alcohol, octadecyl alcohol, phenylethyl alcohol, hydroxyethyl cresol, hydroxyethyl naphthol, dekahydronaphthol, and hydroxy dodekahydrodiphenyl.

6. Compositions as defined in claim 1 wherein the alkaline substance is sodium carbonate.

HANS FIKENTSCHER.
RICHARD ROEHM.